Nov. 14, 1933.  W. J. MILLER  1,934,811
METHOD OF FEEDING GLASS AND MEANS THEREFOR
Filed June 8, 1926  9 Sheets-Sheet 4
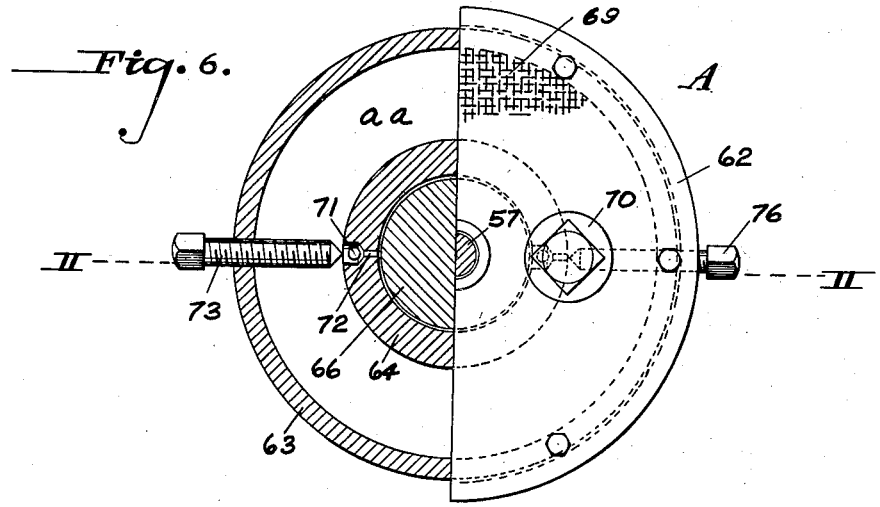
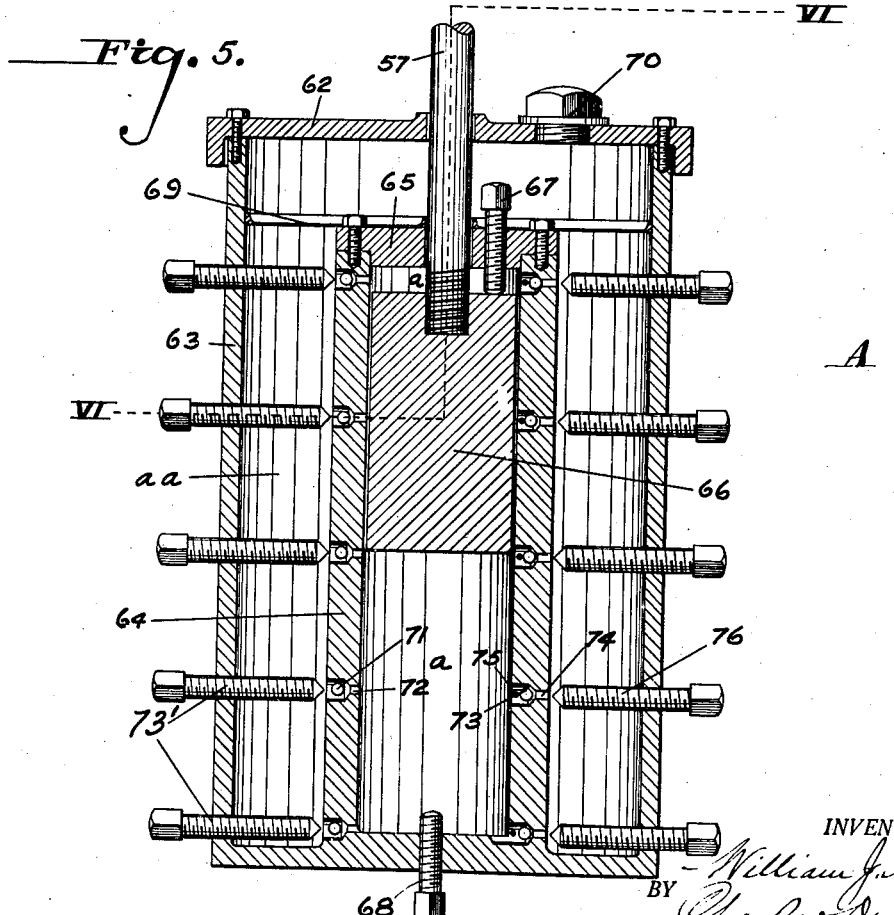
INVENTOR.
William J. Miller
BY Clarke & Doolittle
ATTORNEYS.

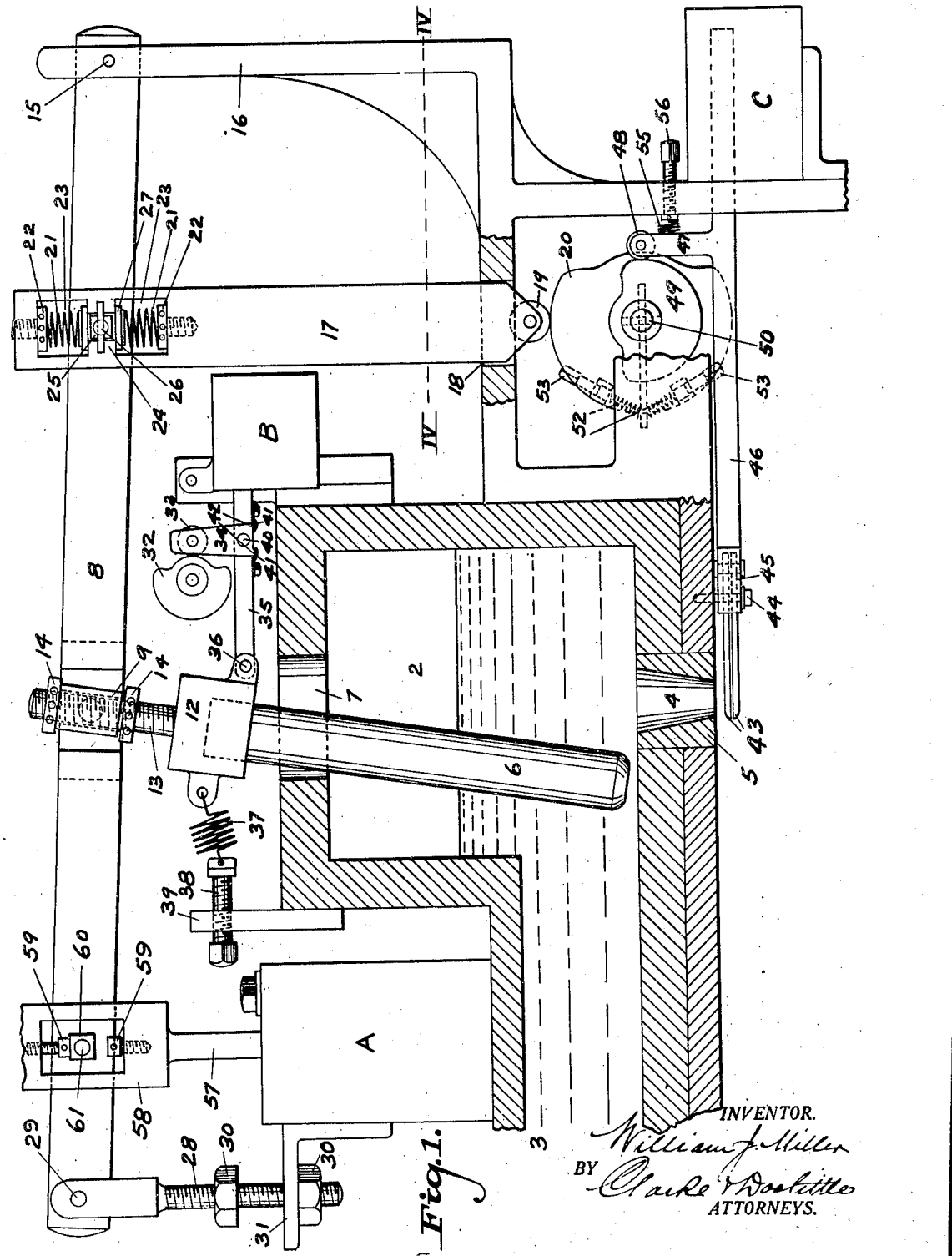

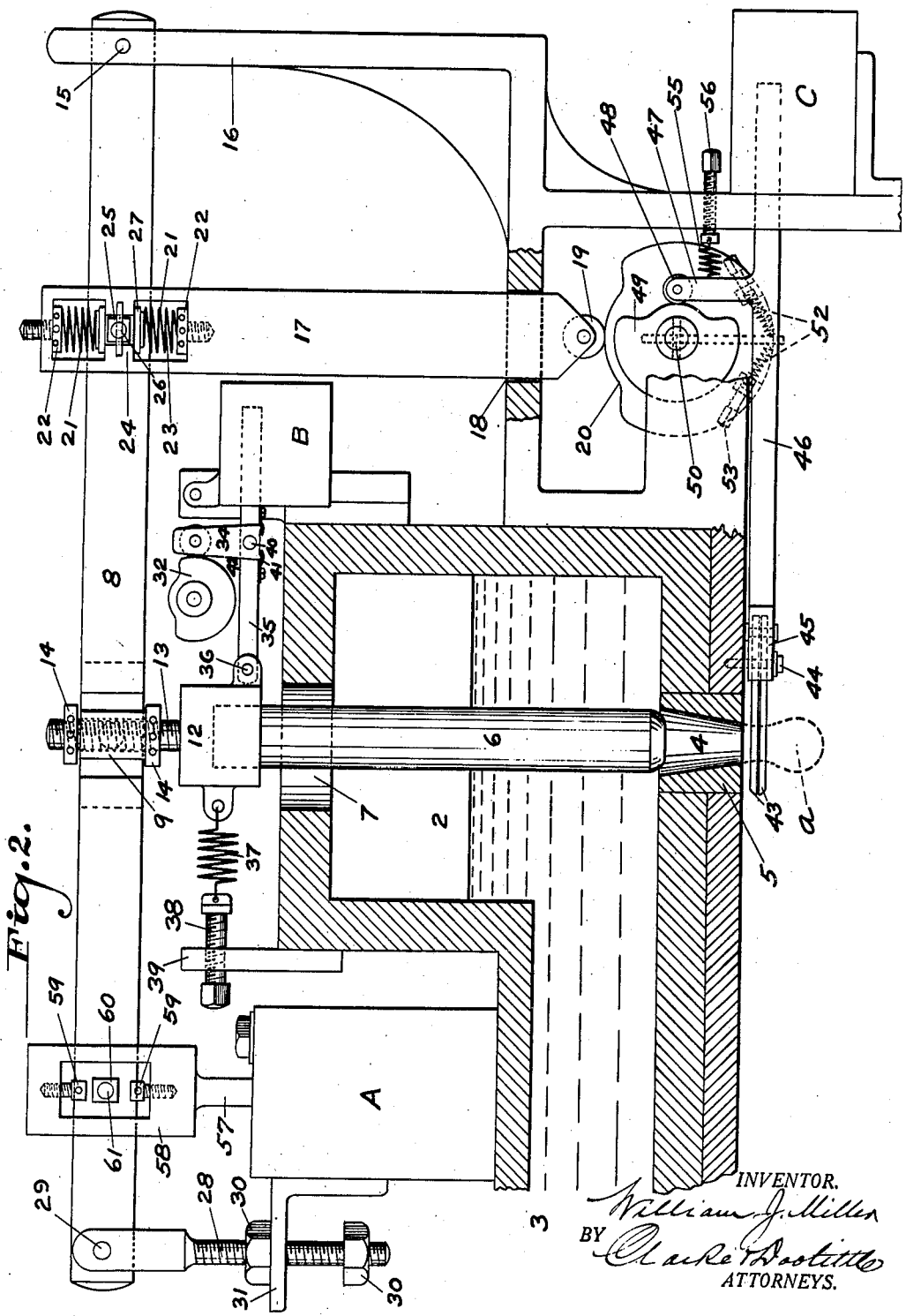

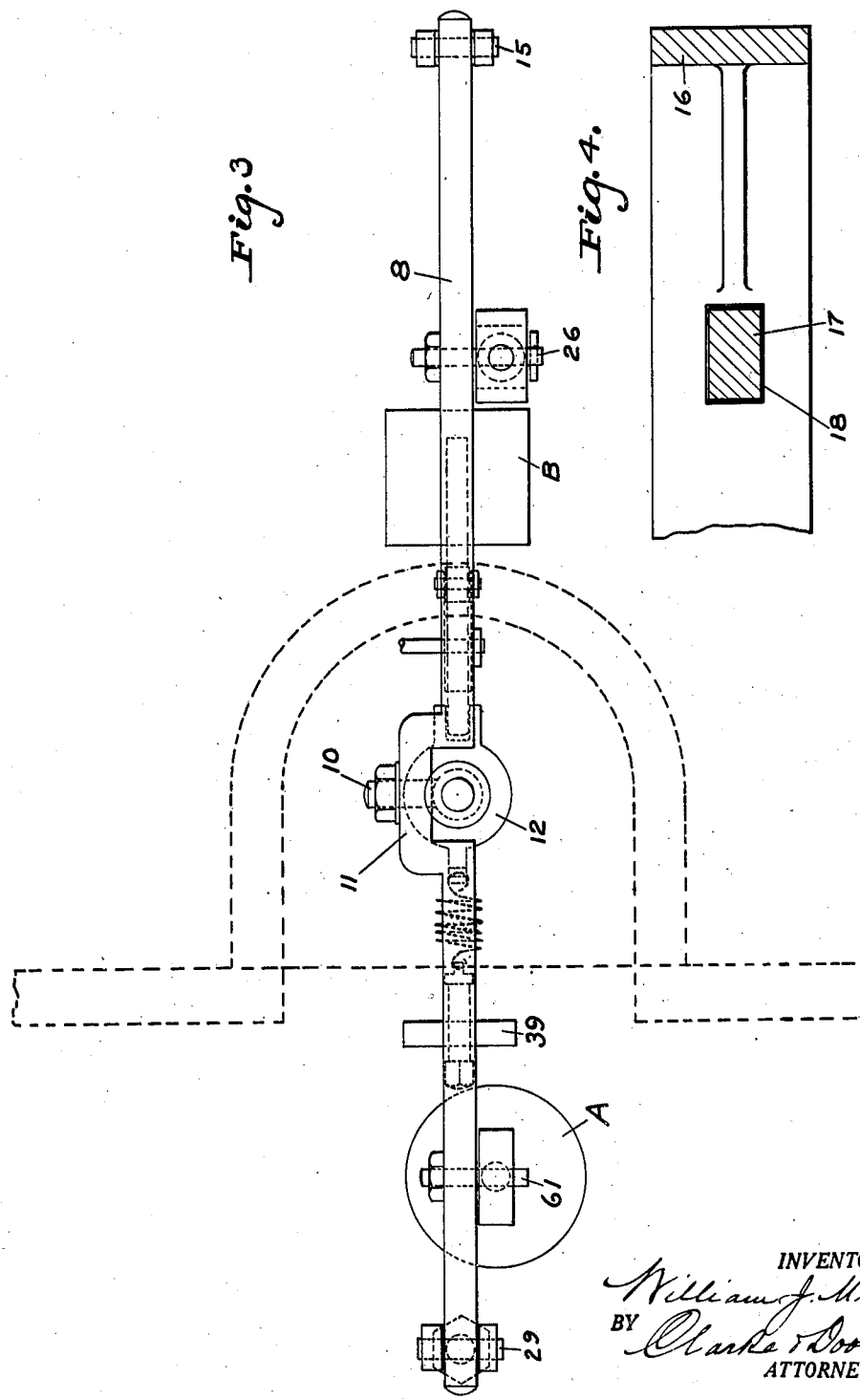

Nov. 14, 1933.  W. J. MILLER  1,934,811
METHOD OF FEEDING GLASS AND MEANS THEREFOR
Filed June 8, 1926    9 Sheets-Sheet 5
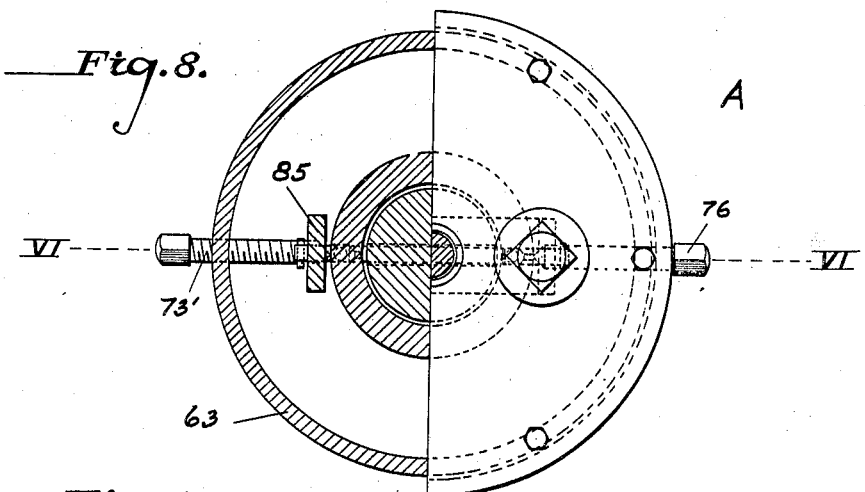
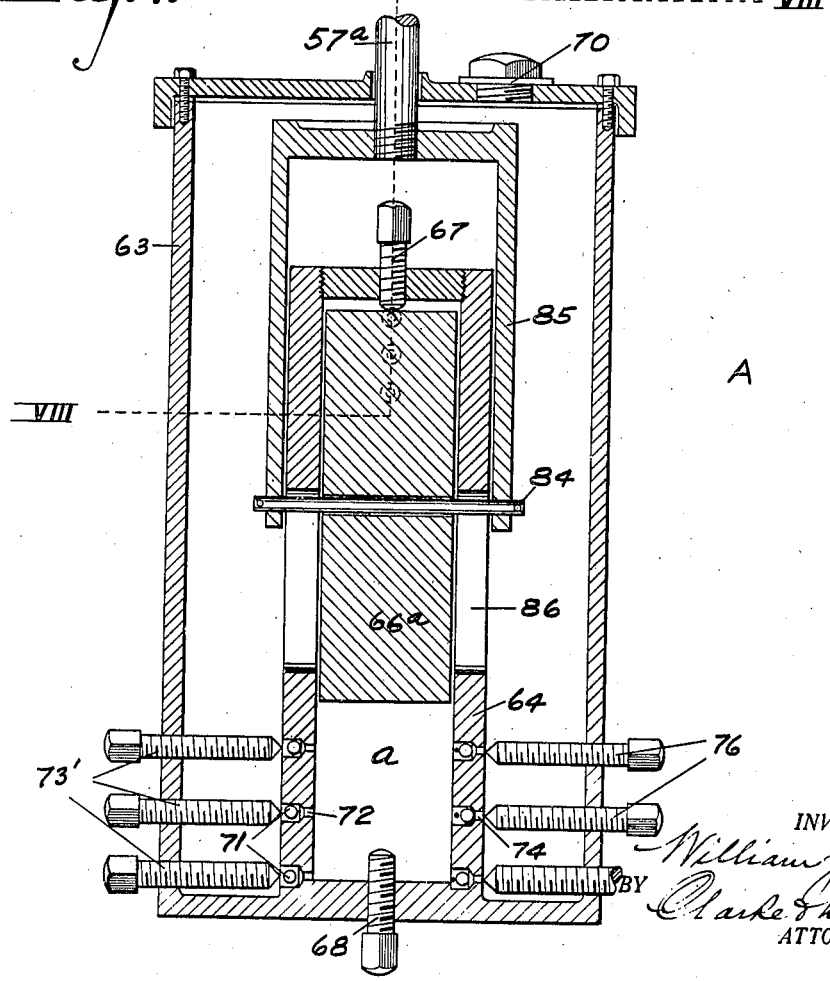
INVENTOR.
William J. Miller
BY
Clarke & Doolittle
ATTORNEYS.

Nov. 14, 1933.   W. J. MILLER   1,934,811
METHOD OF FEEDING GLASS AND MEANS THEREFOR
Filed June 8, 1926   9 Sheets-Sheet 6

INVENTOR.
William J. Miller
BY
Clarke & Doolittle
ATTORNEYS.

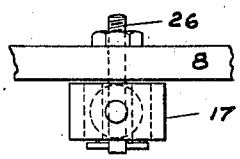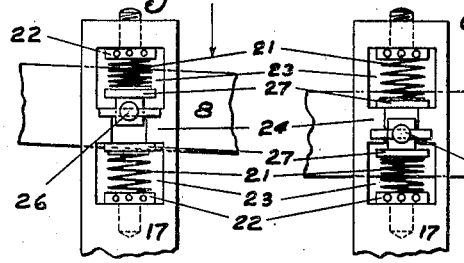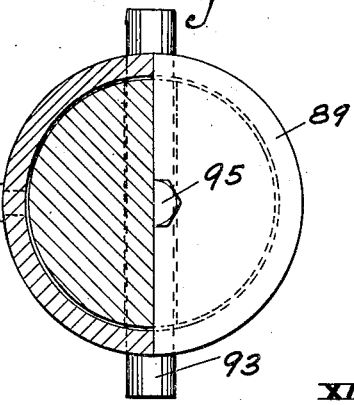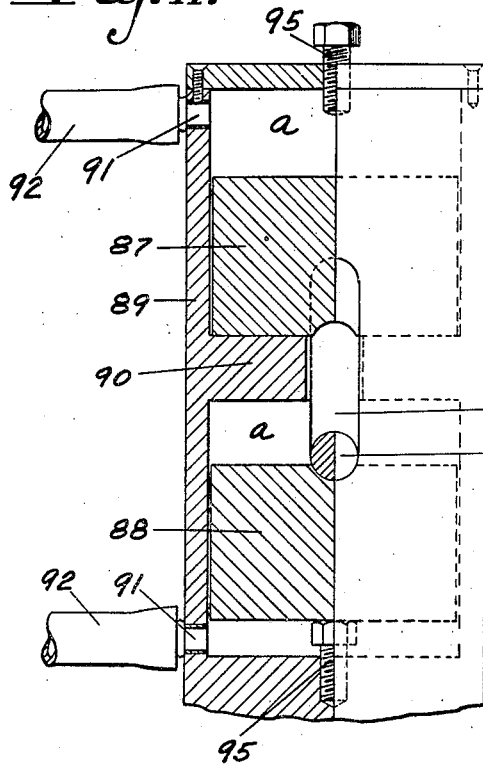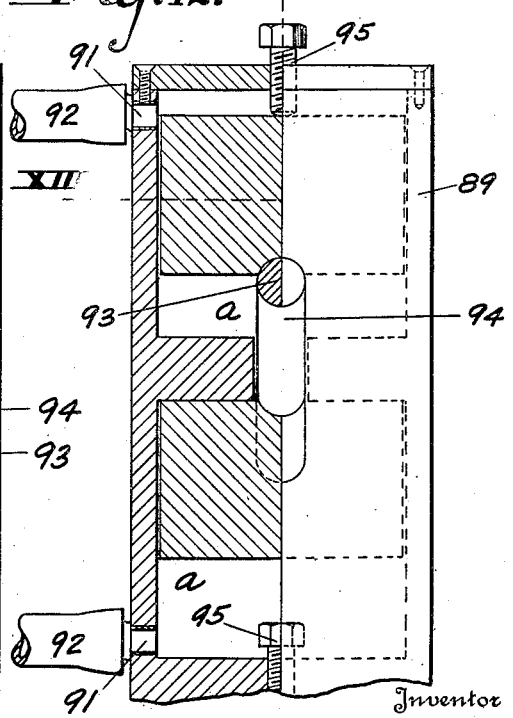

Nov. 14, 1933.                W. J. MILLER                1,934,811
              METHOD OF FEEDING GLASS AND MEANS THEREFOR
                      Filed June 8, 1926        9 Sheets-Sheet 8
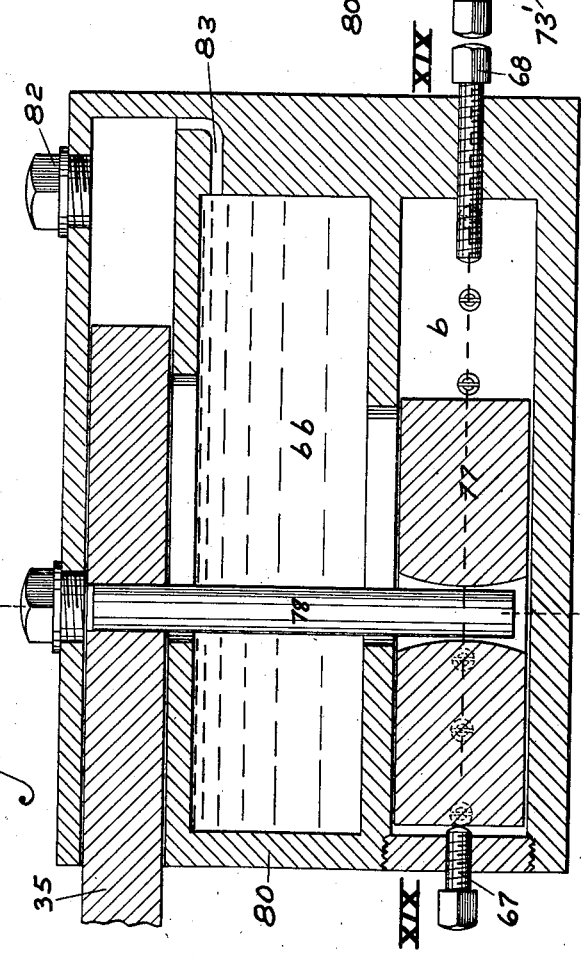
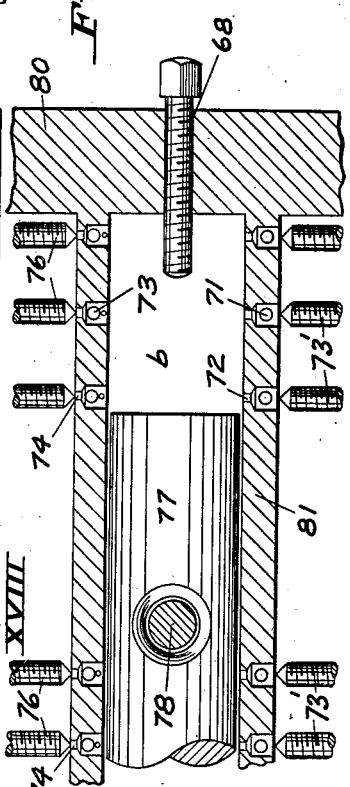
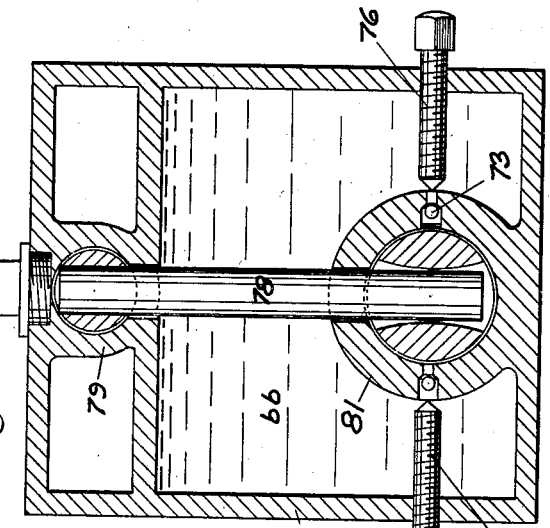
INVENTOR.
*William J. Miller*
BY
*Clarke & Doolittle*
ATTORNEYS.

Nov. 14, 1933.  W. J. MILLER  1,934,811
METHOD OF FEEDING GLASS AND MEANS THEREFOR
Filed June 8, 1926  9 Sheets-Sheet 9
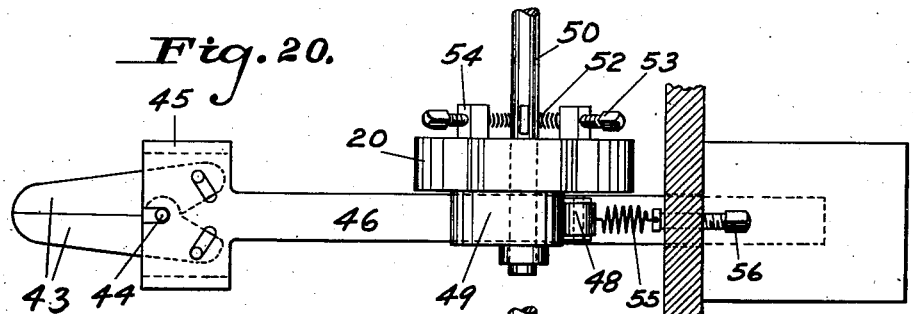
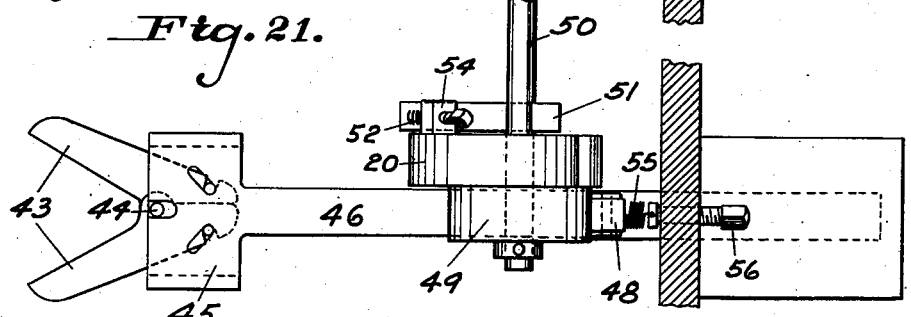
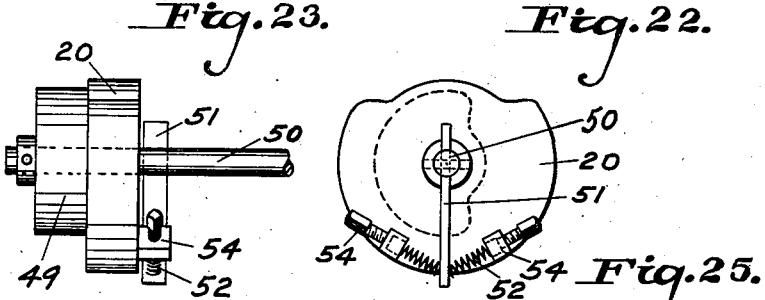
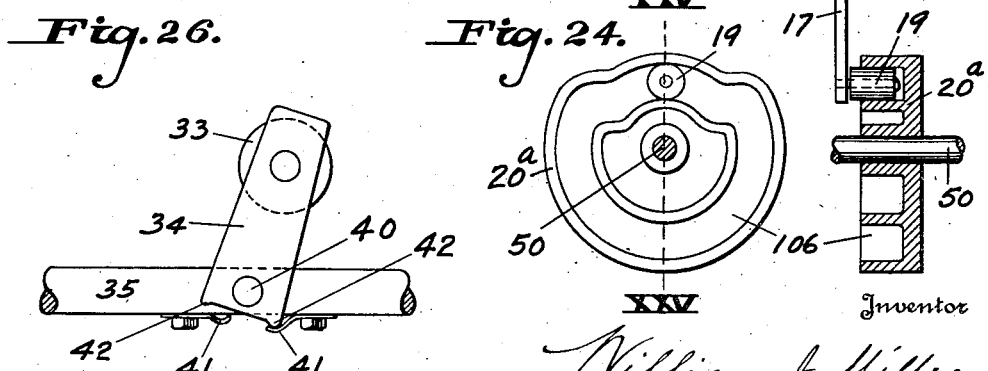
Inventor
William J. Miller
By Clarke & Doolittle
Attorneys Patented Nov. 14, 1933

1,934,811

UNITED STATES PATENT OFFICE 1,934,811

METHOD OF FEEDING GLASS AND MEANS THEREFOR

William J. Miller, Swissvale, Pa.

Application June 8, 1926. Serial No. 114,435

29 Claims. (Cl. 49—55)

My invention refers to an improvement in means for feeding measured amounts of molten glass, and to the method involved therein. It has in view to effect such feeding directly and continuously from a tank or similar container by interposed intermittently operative resistance mechanism of the fluid circulation type.

The particular object in view is to provide interposed regulating mechanism for controlling the stroke of an impeller or of shear mechanism and consequently the size, shape and homogeneity of the extruded gob independently of the primary actuating means for the said impeller and shear mechanism.

Another object of the invention is to provide for producing gobs of glass having a symmetrical temperature and viscosity by interposing an obstruction to that portion of the molten stream in the forehearth which has the highest temperature and which as a result flows more freely than the outer sides of the stream adjacent the walls of the forehearth, the obstruction being shifted in the glass to move the glass and produce a turbulent action and is preferably interposed in the path of the central and top portion of the stream, so that the sides and bottom of said stream, which are of uniform temperature, may flow evenly into the orifice of the forehearth.

In the preesnt method of feeding glass to molds or other forming mechanism, reciprocating elements as plungers, impellers, paddles, or the like, are employed to effect movement of portions of the glass in its progress toward the mold.

In the case of impellers, they are generally, but not necessarily, reciprocated vertically, and shears are usually operated in horizontal planes with reciprocating movements.

Ordinarily, such reciprocation in either case is effected by cam action, which is more uniform and dependable than motion obtained by the use of compressed air in cylinders, but is unsatisfactory, due to the difficulty of altering or variably controlling the speed at which reciprocation takes place, or during such reciprocation.

Various devices, such as cams having adjustable sections, and quick methods of removing and replacing cams, have been used, without, however, successfully and completely accomplishing the desired result of quick adjustment of travel while in operation.

For instance, when it is desired to change the shape of the extruded gob, it is ordinarily necessary to change the speed at which the impeller descends, and also to some extent its ascending speed. The initial ascent of an impeller effects necking of the gob for practical and successful shearing, and as the viscosity of the glass increases or decreases, necking is effected and must be controlled by altering the speed of initial retraction, subsequent elevation of the impeller, and also the descent of the impeller, and the speed of the shearing operation.

In order to alter the shape of a cam or replace it, the mechanism must be temporarily stopped, which delay deranges the viscosity of the glass still further, and results in loss of production and general confusion, so that, in the average factory, it is found much more economical to throw away produced ware made while bringing the viscosity of the glass back to normal, as waste, than to lose the time incidental to altering the speed of reciprocation, with incidental experimental operation and resulting loss and delay.

In the forms of apparatus which I have designed, illustrating the mechanism and method involved herein, I show a cam operated feeder having interposed between the cam and the object to be reciprocated, either impeller, paddle, or shears, means for controlling the speed of reciprocation at any point independent of the initial speed imparted by the cam or any other equivalent means of initially producing reciprocating movement.

Such means provided are in the form of resilient or cushioned compensating and speed regulating devices between the actuating prime mover or element, and the object being actuated, by and through which motion or power is temporarily stored for dissipation later, as required, and controlled by such speed regulation.

For such latter purpose, I have provided a liquid controlled reciprocating piston or plunger within a cylinder or casing, provided with a plurality of properly arranged controlling valves for regulating the inflow and outflow of the regulating liquid, as desired.

Means are also provided for controlling the extent of movement in either direction, in connection with various attendant mechanism and detail features contributing to the efficiency of the apparatus and its correct functioning, in carrying out the method, as hereinafter more fully described.

In the drawings, illustrating certain preferred constructions of mechanism, and for carrying out my improved method:

Fig. 1 is a vertical sectional view, partly in elevation, showing the mechanism as applied to a forehearth of a glass tank, with the impeller raised and laterally shifted;

Fig. 2 is a similar view, showing the impeller lowered in registering position with the outlet opening of the forehearth;

Fig. 3 is a general plan view of Fig. 2;

Fig. 4 is a sectional detail view on the line IV—IV of Fig. 1;

Fig. 5 is a vertical sectional view of the fluid controlled mechanism for regulating the speed and extent of vertical movement of the impeller;

Fig. 6 is a partial sectional view on the line VI—VI of Fig. 5;

Fig. 7 is a view similar to Fig. 5, showing a modified construction;

Fig. 8 is a view similar to Fig. 6 on the line VIII—VIII of Fig. 7;

Figs. 11 and 12 are partial sectional views, showing a modified construction of compensating mechanism in lowered and raised positions respectively;

Fig. 13 is a partial cross sectional view on the line XIII—XIII of Fig. 12;

Figs. 14 and 15 are detail views in raised and lowered positions, respectively, showing the resilient connection between the actuating pitman and the impeller operating arm or lever;

Fig. 16 is a detail plan view of Fig. 14;

Fig. 17 is a longitudinal sectional view of the fluid controlled regulating mechanism for horizontal movement as used in connection with the shears, or for controlling speed of the impeller in lateral movement;

Fig. 18 is a cross sectional view on the line XVIII—XVIII of Fig. 17;

Fig. 19 is a partial horizontal section on the line XIX—XIX of Fig. 17;

Fig. 20 is a detail plan view of the shears and their operating and controlling mechanism, showing the shears closed;

Fig. 21 is a similar view, showing the shears open

Fig. 22 is a detail face view of the combined cams for actuating the impeller pitman and shear mechanism;

Fig. 23 is an edge view of said cam mechanism;

Fig. 24 is a face view, showing a modified construction of cam mechanism for positive action of the lever pitman;

Fig. 25 is a vertical sectional view on the line XXV—XXV of Fig. 24;

Fig. 26 is a detail view, showing the spring controlled tilting post of the laterally operating regulating mechanism for the impeller.

Figure 9:
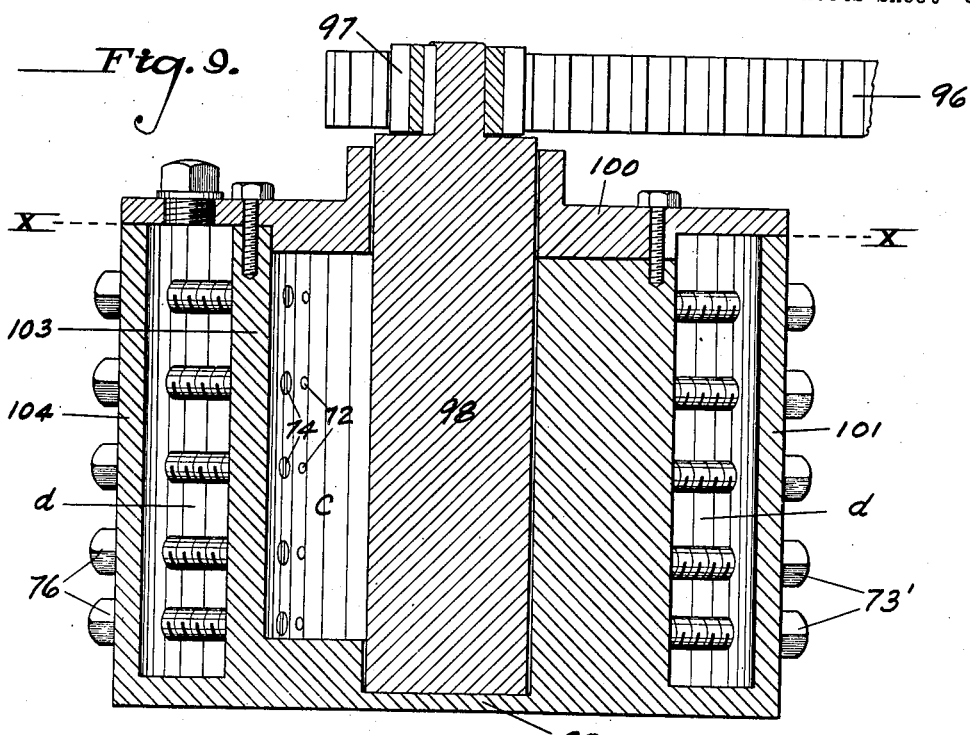
Fig. 9 is a vertical sectional view on the line IX—IX of Fig. 10, showing a further modified construction, utilizing a rotary abutment.

Referring to the drawings, the cavity 2 of the forehearth is in continuous communication with the main furnace chamber 3 of usual construction, providing for continuous communication therebetween of the bath of molten glass, as in Figs. 1, 2 and 3.

The forehearth illustrated in the drawings is of the conventional type, but in practice it is preferred to build the forehearth of less cross-sectional area or more narrow than is usual in similar structures, in order to provide a more clearly defined channel for the molten glass of the highest temperature.

Extending down through the bottom of the forehearth, is the outlet opening 4 for the glass as extruded to form the gob a. Said opening is provided by a suitable apertured and shaped block 5 built into the bottom structure of the forehearth, as is well understood in this art.

An impeller or plunger 6 is arranged for both vertical and lateral movement within the forehearth and in cooperative relation with the opening or discharge orifice 4.

The impeller is reciprocated vertically and in substantially concentric relation with the discharge orifice to discharge the glass in successive mold charges and shape the charges, and alternately said impeller is preferably moved laterally in a direction counter to the direction of flow of the glass to one side of the orifice, and as the impeller moves laterally, it draws the chilling glass in the rear of the impeller forward over the orifice and pushes the hotter glass ahead of the impeller or orifice away from the orifice and creates a void in the glass at the rear of the chilling glass drawn forward by the impeller, which void may be in rear of, or partially over the orifice, and as the hottest or central portion of the stream is backed up and obstructed by the impeller, this portion is caused to divide and fix with the more slowly moving glass in the sides of the channel and swirl around and behind the impeller into the void thus created, the impeller remaining substantially inert until a definite amount of glass has flowed into and through the orifice and then moving back and discharging the glass which is then directly over the orifice. This forward motion of the impeller also restricts the inlet to the orifice on the side from which the hottest or more freely moving glass flows into the orifice and uncovers or enlarges the inlet to the orifice on the side from which the chilling or less freely moving glass flows into the orifice.

This lateral motion of the impeller therefore produces a more uniform charge or gob by obstructing or restricting the flow of the top central portion of the stream and distributing the glass over the cross sectional area of the channel before it flows into the orifice; by drawing the chilling glass in rear of the impeller over the orifice, pushing the hot glass away from the orifice and restricting the inflow of the hot glass and increasing the inflow of chilling glass; by creating a void at the rear of the glass drawn over the orifice and a resultant induced swirl and turbulance of that portion of the glass subject to maximum chill and which prevents unequal chilling of the glass adjacent the orifice.

The method therefore consists in selectively restricting orifice inflow of glass of low viscosity and facilitating orifice inflow of glass of high viscosity to thereby produce mold charges of uniform viscosity.

The plunger 6 extends upwardly through an elongated opening 7 in the roof of the forehearth and is connected with a reciprocating lever 8, by means providing for lateral swinging movement. As shown, such means consists of a supporting sleeve 9 mounted by stud 10 in an offset portion 11 of lever 8, providing for pivoting connection therewith as the lever rises and falls with relation to the substantially vertical arrangement and vertical position of the impeller.

A supporting cap 12 is fixedly secured to the top of the impeller and is provided with a threaded stem 13 which extends upwardly through the sleeve 9 and is provided with nuts 14, 14, for vertical adjustment of the stem and impeller at any desired relative height.

Lever 8 is pivotally mounted at 15 on the upper end of a supporting bracket 16, and is raised by a pitman 17, against the force of gravity. Pitman 17 is guided in an opening 18 of the frame and bears by a terminal roller 19 against the face of cam 20.

Said cam is designed to raise the pitman and lever at and for the desired time and interval for carrying out the operation of feeding the gob. Pitman 17 is connected with lever 8 by resilient mechanism, providing for cushioning of the thrust, so as to ease the movement in transmitting upward or downward travel to the lever.

Such mechanism consists of springs 21 between adjustable screw heads 22 oppositely mounted in openings 23 of the pitman, which is provided with inwardly extending abutments 24 with an intervening clearance opening between them for a squared stud 25.

Said stud forms the wrist through which movement is imparted to lever 8, and is mounted around a stem or bolt 26 secured across the middle of the lever. Springs 21 bear against washer plates 27 which engage the abutments 24 in their normal middle position.

As the pitman moves upwardly, washer 27 makes contact against stud 25, the spring being initially compressed, while imparting gradual upward movement to the lever and impeller. Likewise, upon release of lifting action by cam 20, the weight of the pitman 17 falling through upper spring 21, or positive downward movement of the pitman by the double acting cam of Fig. 24, will tend to cushion its contact with the lever, easing the downward movement in the same way as in Figs. 14 and 15.

At its other or free end, lever 8 is provided with a limiting bolt 28 pivotally connected at 29 and provided with adjustable nuts 30, 30, adapted to engage a flange or bracket 31 at top or bottom, for positively limiting upward and downward movement of the impeller. Bracket 31 is secured to the casing or regulator A, hereinafter described.

Swinging movement of the impeller is effected by cam 32 engaging roller 33 of bracket 34 of an arm 35, which is connected at 36 with the impeller supporting head 12. Said head is connected at the other side with a spring 37 having swivelled connection with an adjusting screw 38 mounted in an abutment or bracket 39, for adjustment of the tension of the spring.

The spring tends to constantly draw the impeller toward the main furnace and cam 32 to throw it in the opposite direction. Bracket 34, carrying the cam roller 33, is pivoted on arm 35 at 40, for tilting movement. It is maintained centrally under resilient pressure of springs 41, 41, engaging the opposite lower corners 42 of the bracket, as shown in Fig. 26, so that a bending or tilting action is permitted under undue strain.

By such means, the action of cam 32 is rendered semi-positive, thus providing for operative association with regulator B, hereinafter described and also relieving the impeller and its parts from sudden or excessive positive movement. Arm 35 extends into the regulator B.

Any suitable shear mechanism may be utilized for severance of the gob $a$ after formation, as, for instance, the blades 43, pivotally mounted at 44 in reciprocating head 45 of a bar 46, of well known construction. Said bar is provided with a lateral arm 47 having a bearing roller 48 for cam 49 mounted on shaft 50 carrying cam 20.

Incidentally, cam 20 is preferably so connected with shaft 50 as to provide for a limited degree of cushioning movement between the shaft and cam. Such movement is provided by means of a tongue or bar 51 extending from the shaft and connected by springs 52 with temper screws 53 mounted in lugs 54 of the cam. By such construction, it will be seen that the shaft may turn slightly in advance of the cam, dependent upon the control of one or the other of the compensator springs 52, the cam finally re-adjusting itself to normal position, whereby to further compensate for regulated retardation of the lever 8.

Arm 46 is thrust backwardly by cam 49, and is held against the cam by compression of spring 55 and adjusting temper screw 56. Arm 46 extends into the shear regulator C, hereinafter described.

Insofar as stated, the means shown and described provide for reciprocation and lateral combined sweeping movement of the impeller in feeding glass to and through opening 4.

As heretofore stated, one of the main objects of the present invention is to interpose between the positively acting cam or other mechanism and the object to be reciprocated or actuated, means for controlling the speed of reciprocation at any point independent of the initial speed imparted by the cam or other equivalent means of initially producing reciprocating or other movement. Such means are embodied in the so-called regulators A, B and C, by and through which stored motion or power is gradually expended or dissipated, as required.

Regulator A

Referring to Figs. 5 and 6, I show one form of such regulator designed for operation with the vertically moving lever 8 connected with said lever by stem 57.

Said stem is provided with a yoke 58 having adjusting temper screws 59, adapted for abutting engagement against block 60 of stud 61, with a degree of lost motion at each side. Stem 57 extends downwardly through cover plate 62 of a cylindrical casing 63 forming with the cover a closed chamber for any suitable liquid, as oil.

An inner plunger chamber is provided within the upwardly extending concentric wall 64 provided with a separate closure 65 at the top, through which the stem 57 extends for connection with the plunger 66. Said plunger fits slidably within the chamber $a$ with a range of movement limited by upper and lower temper screws 67, 68.

A screen 69 extends across the entire area of the outer casing, for prevention of entrance of any foreign matter in filling the outer chamber $a$, $a$, with oil through closure 70. At one side, wall 64 is provided with a vertically arranged series of outwardly opening ball valves 71 adapted to close ports 72 against inward circulation, and to be regulated or positively closed by the individual pointed set screws 73'.

At the other side, a corresponding series of inwardly-opening outwardly-closing ball valves 73 are provided for a corresponding series of ports 74, the balls being retained against escape by limiting pins 75.

Each of said ports 74 is also capable of being positively opened or closed by a corresponding tapered set screw 76 extending inwardly like set screw 73' through casing 63.

Plunger 66 is designed to be raised or lowered by lever 8 in connection with the vertical movement of the impeller, and the purpose of regulator A is to interpose a retarding resistance to such movement, either upwardly or downwardly.

Thus, on upward movement of the lever and plunger 66, liquid will be forced outwardly of chamber *a* above the plunger, through one or more of the ports 72 into outer chamber *a, a,* from which liquid will pass inwardly through one or more ports 74 as they are uncovered.

Likewise, on downward movement of plunger 66, liquid will pass outwardly through one or more ports 72 below the plunger and inwardly through one or more of ports 74 above the plunger, the number of such ports increasing or diminishing behind and in front of the plunger, as to their operation, as the plunger advances in either direction.

By such arrangement, it will be seen that resistance may be interposed to the movement of the lever, and impeller, which is capable of very fine and accurate control and regulation. By either fully opening or entirely closing one or more of the ports 72 or 74 by set screws 73' or 76, the number of the operative ports may be regulated. By partial adjustment of one or more of the set screws, the circulating area of either port may be very accurately controlled, so that the circulation of the liquid and the resistance to the movement of the plunger is readily regulated within an extended range.

Regulator B

In the same general manner, I provide for regulating resistance to the lateral movement of the impeller by the regulator B. In its construction, the same general principle of operation is utilized through the lateral movement of a plunger 77 actuated by stem 78 of arm 35, such arm extending inwardly through a suitable upper bearing portion 79 of main casing 80.

Said casing, which is horizontally mounted in any suitable manner at one side of the top of the forehearth, is provided with an outer main liquid storage or containing chamber *b, b,* and an inner plunger chamber *b*, in which is mounted the reciprocable plunger 77. Chamber *b* is enclosed within an inner wall 81, through which the circulation of the liquid passes in the same manner as above described, by inwardly opening ports 74 and outwardly opening ports 72 controlled by the ball valves 73 and 71 in the manner described, in connection with the regulating set screws 76 and 73'. Liquid is supplied to the upper main reservoir *b, b,* by plug controlled opening 82 leading into the casing for arm 35, and by port 83, as in Fig. 17, to reservoir *bb*.

In such construction, reciprocation of the plunger 77 by cam and spring actuated arm 35 is accurately regulated and controlled through resistance of the circulating fluid, as in the regulator A.

It will be seen that regulator B provides a readily accessible means exterior of the forehearth whereby the lateral movement of the impeller may be adjusted while in operation regardless of cam 32 and independently of resistance due to varying temperature and viscosity of the glass. Thus the time during which the orifice remains uncovered and the amount of uncoverage during each cycle of impeller travel and consequently the size and shape of the gob may be adjusted through the medium of regulator B independently of the vertical reciprocation of the impeller. For an example of one of the advantages of this feature, let it be assumed that the room c factory temperature has lowered sufficiently to affect the viscosity of the glass in and adjacent the orifice or that operations have been temporarily suspended and the viscosity of the glass is increased and flows less freely. Regulator B may then be adjusted to accelerate the lateral movement of the impeller away from the orifice and slow up its return movement and thereby permit the orifice to remain uncovered or fully open until a predetermined portion of the gob has passed by gravity into and through the orifice, whereupon the impeller is reciprocated vertically to expel the gob. If the viscosity of the glass is reduced and flows more freely, regulator B may then be adjusted to decelerate the lateral movement of the impeller away from the orifice and accelerate its return to the orifice and/or limit the lateral movement of the impeller so that it only partially uncovers the orifice, and thus equalize the size of the gob by reducing the time during which the orifice is open to glass inflow prior to vertical reciprocation of the impeller in the orifice and/or the inlet to the orifice.

Regulator C

Regulator C is generally of the same construction and operation as just described as to regulator B, arm 46 of the shear mechanism being connected with a similar plunger and operating in the same manner to regulate and control the action of the shears. Such compensation, either with or without the mechanical cushioning mechanism already described in connection with cams 20 and 49, provides means for very accurately regulating the shearing action of the gob.

I have shown in Figs. 7 and 8 a further modification of the regulating mechanism in which a plunger 66*a* is connected by means of a cross pin 84 with yoke 85 of stem 57*a*. In such case, the plunger acts in the manner of a dash-pot in chamber *a* within the inner wall 64, pin 84 having slotted clearance 86 through opposite sides of said wall.

The inwardly opening valve controlled ports 74 cooperate with the outwardly opening circulation ports 72, their valves and controlling set screws acting in the same manner, generally, as above described. The valves and set screws are arranged in sets, as shown in section at the bottom, and as indicated in dotted lines at the top, and operate to interpose regulated resistance, either upon downward movement of the plunger or on upward movement, as will be readily understood.

The regulator in such form is generally similar to that of Fig. 5, and the parts are identified by corresponding numerals.

In Figs. 11 and 12, I show a further modified construction of regulating mechanism, in which a pair of plungers 87 and 88 are mounted in individual chambers *a* and *a*, respectively, at opposite end portions of a casing 89 having an intervening cross partition 90.

Each chamber *a* is connected by a lateral port 91 and conduit 92 with a superimposed reservoir or tank, so that upward movement of one plunger or downward movement of the other will effect circulation of a contained liquid, through one or the other such connection against the resistance of the liquid in the reservoir. Actuation of the plungers is by means of a cross pin or rod 93 working in slot 94, the plungers being limited in their extreme movement by regulating set screws 95.

Figure 10:
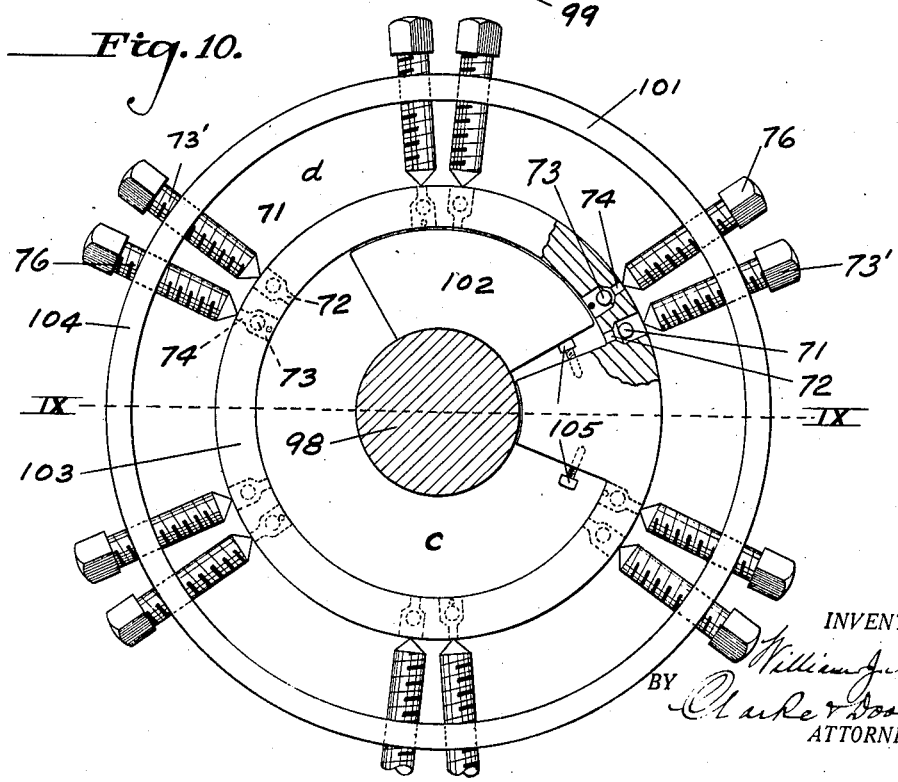
Fig. 10 is a sectional plan view on the line X—X of Fig. 9.

I show in Figs. 9 and 10 a further modified construction of regulator for use with a rotary abutment, acting in the manner of a plunger.

In such case, rotary movement is imparted from a reciprocating member of any suitable kind, as a rack 96 engaging pinion 97 of a stem 98 mounted in the base 99 and cap 100 of a casing 101.

Stem 98 is provided with a radially extending annular wing 102 operable in a chamber c of inner casing 103. Between casing 103 and outer casing 101, is a circulating chamber d. Casing 103 is provided with series of outwardly circulating ports 72 and inwardly circulating ports 74 controlled by ball valves 71 and 73 respectively, and adjusting tapered set screws therefor 73' and 76, as above described.

The valve controlled ports 72 and 74 are arranged in annularly spaced sets or pairs of rows, of any desired number, as two such rows.

In operation, rotation of stem 98 in one direction or another will effect outward movement of the liquid from chamber c into chamber d, through ports 72 in advance of wing 102, and inward flow of the liquid from chamber d to chamber c, through port or ports 74, in the rear of either of such ports. Or, by adjusting the several set screws 73' and 76, it will be seen that the flow of liquid and its resistance within the chamber c may be very accurately throttled and controlled so as to interpose a regular and exactly limited amount of resistance, by regulating the circulation through such ports.

The movement of abutment 102 at the limit of its stroke in either direction is regulated by any suitable means, as one or more set screws 105 for positively arresting the wing travel.

It will be understood, of course, that one or more of either vertical series of ports 72 and 74 may be entirely closed and that the extent of the circulation through the other ports, either inwardly or outwardly, is within the control of the operator for correct adjustment from the exterior of the casing. In Figs. 24 and 25 I show a modified form of cam 20a for positive actuation of pitman 17 either upwardly or downwardly.

In such case the cam is provided with a closed groove 106 for the roller 19 of the pitman, ensuring its engagement and positive actuation and control at all positions of the cam.

By means of the several regulating mechanisms, of whatever form is best adapted to the work, I am enabled to very accurately and definitely maintain continuous control of the feed.

With any construction of forehearth delivery from a main tank supply, the operation of the impeller may be adapted to meet the conditions. Its reciprocation vertically in either impulse or retraction movements, may be exactly adapted to the requirements of operation. Reciprocation laterally, in cooperation with, or independent of vertical reciprocation, is equally capable of definite and exact adjustment and regulation.

This is especially useful in connection with a forehearth supply, in adapting or regulating the flow towards the outlet 4 from any selected portion of the forehearth.

It will be understood also that the direction of lateral movement of the impeller may be varied from parallelism with the lever 8 by suitably locating the oppositely acting arm 35 and spring 37.

By means of the regulating units A, B or C, of the different constructions shown, it will be clear that the regulation of movement of the impeller or of the shears is provided for without interruption of operation. This is of great advantage in avoiding delay due to change or adjustment of cams or other positively acting driving means, and provides for ample and very accurate adjustment and regulation of movement while the driving connection subsists or continues.

Also that the principle of operation and the method of feeding glass is in no way restricted in application to the particular means for actuating and controlling the impeller or to the detail features shown.

What I claim is:

1. In glass feeding apparatus, a flow controlling impeller, a raising lever therefor, a positively actuated lifting element having cushioned connection with the lever, an abutment bracket, a stem mounted adjacent said abutment bracket and also connected with the lever having adjustably mounted limiting abutments for limiting the movement of the lever upwardly or downwardly, and means interposed between said impeller and said stem for retarding the movement of said lever.

2. In glass feeding apparatus, a flow controlling impeller, a raising lever therefor, a positively actuated lifting element having cushioned connection with the lever, and a fluid controlled regulating device having a plunger with a stem adjustably connected with the lever for interposing retarding resistance to the movement of said impeller, said device being adjustable independently of said lifting element.

3. In glass feeding apparatus, a flow controlling impeller, a raising lever therefor, a positively actuated lifting element having cushioned connection with the lever, and a fluid controlled regulating device having a plunger with a stem adjustably connected with the lever and valve controlled circulating ports for interposing retarding resistance to lever movement, said device being adjustable independently of said lifting element.

4. In glass feeding apparatus, the combination with a forehearth having a discharge orifice in the floor thereof, of a vertically and laterally reciprocable impeller, and means for reciprocating the impeller vertically in the orifice to expel the glass and laterally to one side thereof to part the stream of glass flowing into and through the orifice.

5. In glass feeding apparatus, the combination with a forehearth having a discharge orifice in the floor thereof, of a vertically and laterally reciprocating impeller, means for reciprocating the impeller vertically in the orifice to expel the glass and also laterally to one side of the orifice, and means for interposing retarding resistance to such reciprocation.

6. In glass feeding apparatus, the combination with a forehearth having a discharge orifice in the floor thereof, of a vertically and laterally reciprocable impeller, means for reciprocating the impeller vertically relatively to the orifice and also laterally to one side thereof, and means for interposing fluid-circulating retarding resistance to such reciprocation and for regulating the resistance.

7. In glass feeding apparatus, the combination with a forehearth having a discharge orifice in the floor thereof, of a glass feeding impeller adapted to reciprocate vertically and also laterally to one side of the orifice, a lever therefor, a positively acting raising pitman, cushioning springs between said pitman and said lever, positively acting means connected with said impeller for imparting lateral reciprocation thereto, and means for interposing fluid-circulating retarding resistance to both the vertical and lateral reciprocation of said impeller, said means being adjustable to vary the extent of reciprocation of said impeller.

8. In glass feeding apparatus, the combination with a forehearth having a discharge orifice in the floor thereof, of a glass feeding impeller adapted for lateral and vertical movement, a lever therefor, a positively acting raising pitman for imparting vertical movement to said impeller through said lever, means for moving the impeller laterally to one side of the orifice, and a fluid-circulating retarding resistance device having lost motion connection with said lever.

9. The combination with a laterally movable glass feeding impeller and primary actuating means therefor, of a laterally moving arm pivotally connected at one extremity to said impeller and at its opposite extremity provided with a plunger member, and means engaging said member for interposing regulable resistance to the lateral movement of said impeller.

10. The combination with a laterally movable glass feeding impeller, and primary actuating means therefor, of a laterally moving arm pivotally connected at one extremity to said impeller and at its opposite extremity provided with a plunger member, fluid circulating means engaging said member for interposing regulable resistance to the lateral movement of said impeller, and a retracting spring also connected to said impeller.

11. The combination with a laterally movable glass feeding impeller, of a laterally moving arm pivotally connected at one extremity to said impeller, means for positively actuating the arm and impeller, and fluid-circulating retarding resistance mechanism therefor, said mechanism being adjustable to vary the range of lateral movement of the impeller.

12. In glass feeding apparatus, the combination with a forehearth having a discharge orifice, of a reciprocably mounted impeller, cam means and means for driving said cam means at a constant speed, means for transmitting motion from said cam means to said impeller to reciprocate the latter, and a means for regulating the speed of reciprocation of the impeller independent of the driving speed of said cam means.

13. In glass feeding apparatus, the combination with a forehearth having a discharge orifice, of a reciprocably mounted impeller, cam means and means for driving said cam means at a constant predetermined speed, means for transmitting motion from said cam means to said impeller to reciprocate the latter including a positively acting raising pitman, and a fluid-circulating means for regulating the speed of reciprocation of the impeller independent of the speed of reciprocation of said pitman.

14. In glass feeding apparatus, the combination with a forehearth having a discharge orifice, of an impeller mounted to reciprocate substantially vertically in the orifice and laterally to one side thereof, rotary cam means driven at a constant speed, means for transmitting motion from said cam means to said impeller to reciprocate the latter, and a means for regulating the speed of reciprocation of the impeller independent of the temperature of the glass and without varying the speed of rotation of said cam means.

15. In glass feeding apparatus, the combination with a forehearth having a discharge orifice, of an impeller mounted to reciprocate vertically in the orifice and laterally to one side thereof in a direction counter to the direction of flow of molten glass into the orifice, cam means adapted to be driven at a constant predetermined speed, means for transmitting motion from said cam means to said impeller to reciprocate the latter, and a fluid-circulating means for regulating the speed of reciprocation of the impeller without varying the speed of the cam means.

16. In glass feeding apparatus, the combination with a forehearth having a discharge orifice, of a glass feeding impeller mounted to reciprocate vertically and also laterally to one side of the orifice, cam means adapted to be driven at a constant speed, means for transmitting motion from said cam means to said impeller including a lever and pitman, cushioning means interposed between said pitman and said lever, and a means for varying the speed of reciprocation of the impeller without varying the drive speed of the cam means.

17. In glass feeding apparatus, the combination with a forehearth having a discharge orifice, of a reciprocably mounted glass feeding impeller, cam means driven at a constant fixed speed, means for transmitting motion from said cam means to said impeller to reciprocate the latter including a raising pitman and lever means, and a fluid-circulating means acting on said lever means and adjustable to vary the speed of reciprocation of said impeller without varying the drive speed of said cam means.

18. In glass feeding apparatus, the combination with a forehearth having a discharge orifice, of a reciprocably mounted glass feeding impeller, resiliently mounted cam means adapted to be driven at a constant speed, means for transmitting motion from said cam means to said impeller to reciprocate the latter including a pitman and lever, and a means for varying the speed of reciprocation of said impeller without varying the drive speed of said cam means.

19. In glass feeding apparatus, the combination with a forehearth having a discharge orifice, of a reciprocably mounted impeller, rotary cam means, means for transmitting motion from said cam means to said impeller to reciprocate the latter, and means for regulating the speed of reciprocation of the impeller independently of the temperature of the glass and also independently of the said cam means, to provide for control exterior of the forehearth of the size and/or shape of the extruded gob during constant rotation of said cam means.

20. In glass feeding apparatus, the combination with a forehearth having a discharge orifice, of a reciprocably mounted impeller, rotary cam means, means for transmitting motion from said cam means to said impeller to reciprocate the latter, and a fluid-circulating means cooperating with said motion-transmitting means for regulating the speed of reciprocation of the impeller independently of the temperature of the glass and also independently of said cam means, to provide for control exterior of the forehearth of the size and/or shape of the extruded gob during constant rotation of the said cam means.

21. The method of utilizing a vertically reciprocating plunger to control the delivery of molten glass through a downwardly opening outlet, comprising moving the plunger laterally away from the outlet in the direction of supply of hot glass to cause cooler glass on the opposite side of the outlet to flow into the outlet.

22. The method of utilizing a vertically reciprocating plunger to control the delivery of molten glass through a downwardly opening outlet, comprising moving the plunger laterally away from the outlet in the direction of supply of hot glass to cause cooler glass on the opposite side of the outlet to flow into the outlet and moving the plunger into the outlet to eject the glass therethrough.

23. The method of utilizing a vertically reciprocating plunger to control the delivery of molten glass through a downwardly opening outlet, comprising raising the plunger out of the outlet, periodically shifting the plunger laterally away from the outlet in a direction toward the hottest glass and away from the coldest glass to cause the coldest glass to flow into the outlet, and ejecting the glass from the outlet.

24. The method of utilizing a vertically reciprocating plunger to control the delivery of molten glass through a downwardly opening outlet, comprising raising the plunger out of the outlet, periodically shifting the plunger laterally away from the outlet in a direction toward the hotest glass and away from the coldest glass to cause the coldest glass to flow into the outlet, returning the plunger to a position over the outlet, and moving it downwardly to force the glass through the outlet.

25. The method of governing the feed of glass for supplying charges of substantially uniform temperature and consistency from a receptacle having a discharge orifice and a flow channel leading thereto by means of a reciprocating plunger having a working motion toward and from the orifice and normally in axial alinement therewith, which consists in causing the plunger to move laterally out of its normal working line and away from the orifice into the glass at the highest temperature and away from the glass stagnating about the orifice so as to relatively widen and constrict portions of the flow passage for relatively increasing and decreasing the speed of flow of portions of glass of relatively high and low degrees of temperature and consistency, returning the plunger to its normal position, mingling the portions of glass, and moving the plunger in its normal working line to eject the glass in mingled condition through the discharge orifice.

26. In a glass feeder, a receptacle having a glass storage chamber, an outlet, and a well leading from the storage chamber to the outlet, a reciprocatory plunger controlling the flow of glass through the well and to the outlet, means for raising the plunger out of the well, and means for shifting the plunger laterally toward the portion of glass at the highest temperature and away from the well to effect the flow of cooler glass into the well, said means for raising and laterally shifting the plunger being operative for returning the plunger to the well and discharging the glass therefrom.

27. In a glass feeder, a receptacle having a glass storage chamber, an outlet and a well leading from the storage chamber to the outlet, a vibratory member, and a plunger vertically reciprocated by said vibratory member in the well toward and from the outlet, said plunger being so coupled to the vibratory member as to be free for lateral movement, and means operable when the plunger is in its raised position for shifting the plunger laterally away from the well toward the hottest portion of glass to retard the flow of hot glass toward the well and draw the cooler glass about the well into the same.

28. In a glass feeder, a glass containing chamber having an outlet, a glass conducting channel leading from the chamber to the outlet, a plunger vertically reciprocable in said channel toward and from the outlet and free to be moved laterally in the glass in said channel flowing toward said outlet and means for shifting the plunger laterally away from the outlet toward the hottest portion of glass in said channel and back to a position over the outlet for controlling the flow of relatively hot and cool glass into the opening.

29. The method of controlling the feed of glass of different temperatures for discharge through a downwardly opening outlet under control of a periodically operated control device adapted to be positioned in said outlet, comprising passing a confined stream of hot glass to the outlet, raising the control device out of the outlet and laterally shifting the device in a direction opposite to the flowing stream of hot glass away from the outlet thereby causing a portion of the cooler glass stagnating about the outlet to move into the outlet, returning the control device into the outlet, and ejecting the body of glass from the outlet.

WILLIAM J. MILLER.